Figure 4:
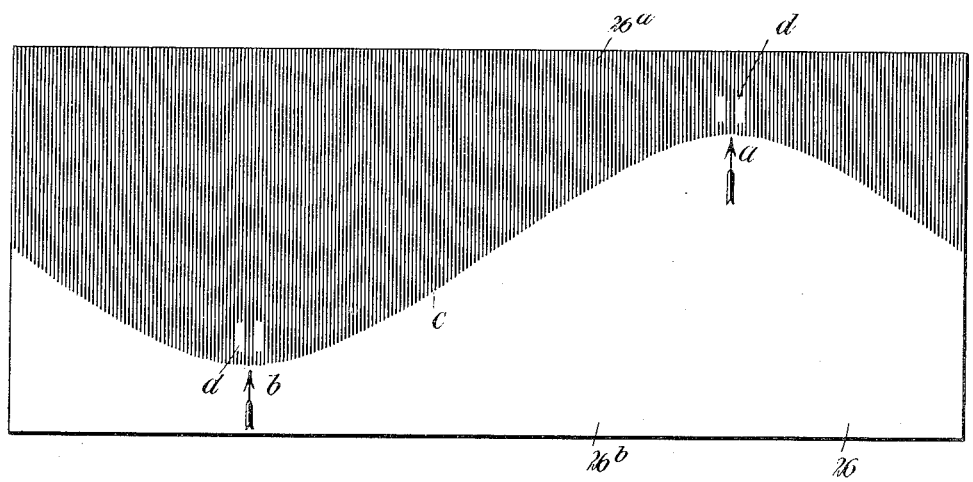

A. F. BENSON.
RECORDING INSTRUMENT.
APPLICATION FILED SEPT. 10, 1910.
1,054,495.
Patented Feb. 25, 1913.
2 SHEETS—SHEET 1.
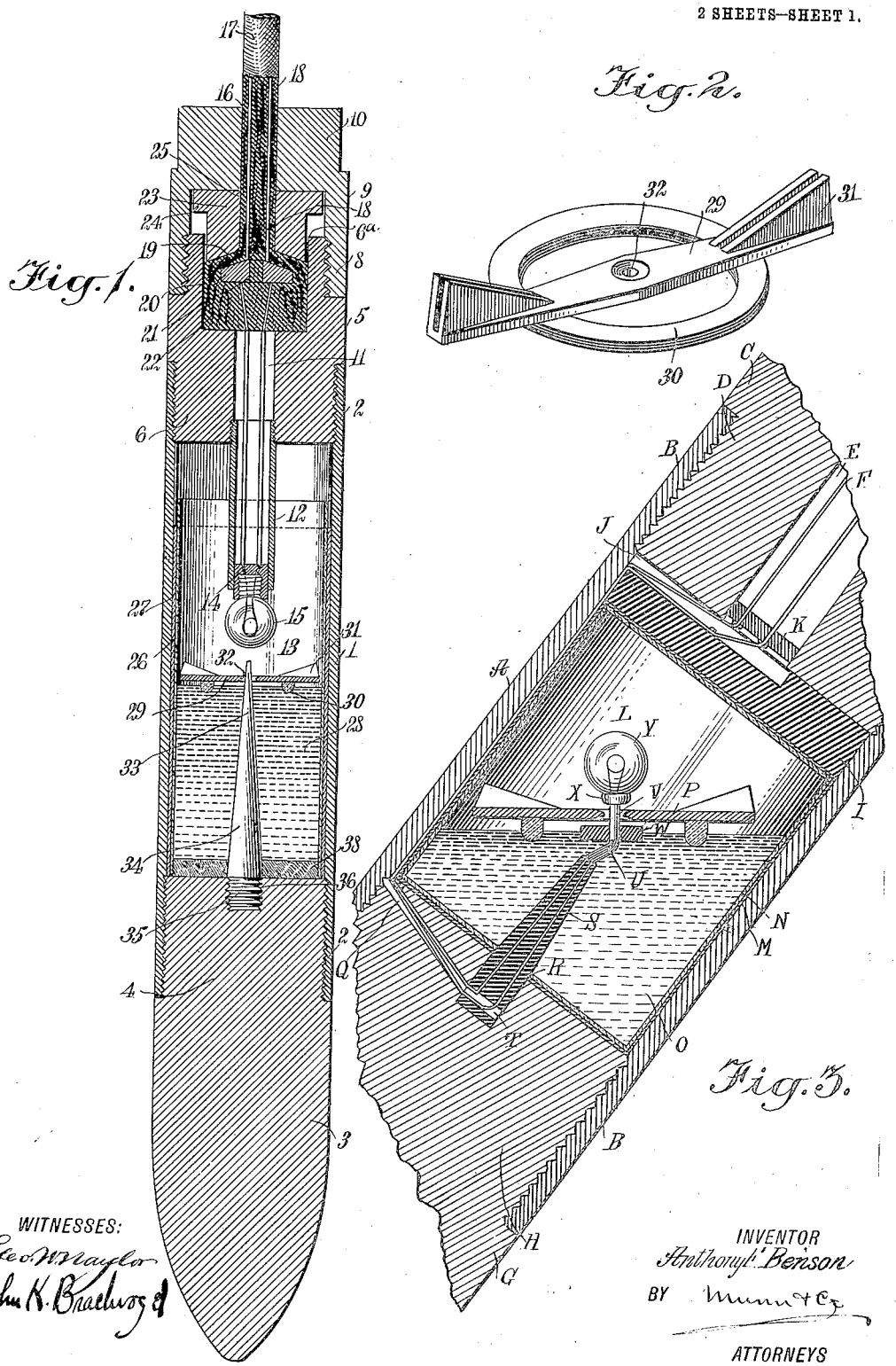
WITNESSES:
INVENTOR
Anthony F. Benson
BY Munn & Co.
ATTORNEYS

UNITED STATES PATENT OFFICE.

ANTHONY FREDERICK BENSON, OF VIRGINIA, MINNESOTA.

RECORDING INSTRUMENT.

1,054,495.  Specification of Letters Patent.  Patented Feb. 25, 1913.

Application filed September 10, 1910. Serial No. 581,401.

*To all whom it may concern:*

Be it known that I, ANTHONY F. BENSON, a citizen of the United States, and a resident of Virginia, in the county of St. Louis and State of Minnesota, have invented a new and Improved Recording Instrument, of which the following is a full, clear, and exact description.

This invention relates to instruments for determining the dip and bearing of drill holes, and from which permanent photographic records may be obtained of the existing conditions encountered as the instrument is lowered down into the drill hole.

An object of my invention is to provide a device of the class described, by which readings of both dip and bearing can be taken at any point in a drill hole, simultaneously.

A further object is to provide an instrument by which a photographic record may be made of the dip and bearing at any point in a drill hole, whereby a permanent record of existing conditions may be had and kept for future reference.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 shows a longitudinal, sectional view of an embodiment of my invention; Fig. 2 is an enlarged perspective view of a magnetic indicator mounted upon a supporting ring; Fig. 3 is a fragmentary, sectional view of a modified form of my invention, which is especially adapted for use in drill holes where the angle between the vertical and the center line is too great to be recorded by my preferred form illustrated in Fig. 1; and Fig. 4 is a plan view of a developed record produced by the instrument.

Before proceeding to a more detailed description of my invention, it should be understood that in drilling, when it is desired to ascertain any variation from the original dip and bearing as the hole proceeds, the customary method was to employ hydrofluoric acid in a glass tube for the dip, and to mark the drill rods as they went down, for the bearing, a process that was both laborious and inaccurate, and which consumed much valuable time. To obviate the many difficulties which arose from the use of the above-described system, I have provided a device which can be lowered down the drill holes to practically any depth, and which, at any given point, may be operated to record the dip and bearing, simultaneously, at that point. To accomplish this, I have provided my instrument with a recording chamber having sensitized paper arranged therewithin, together with the necessary indicating mechanism, which will be described more fully hereinafter. Located within this chamber is a small electric light globe, which is manually operable by the person engaged in using the instrument. When my invention has been lowered to the point at which the dip and bearing are to be taken, the interior of the chamber is illuminated by means of the electric light, and a permanent record made of the exact positions of the indicating mechanism upon the sensitized paper. After withdrawing the instrument from the drill hole, the sensitized paper may be removed and developed in a like manner in which any photographic film is ordinarily treated. In this way an exact record is procured of the conditions at the point at which the exposure was made, and can be filed away for future reference. It may be added that the term dip is used to indicate the inclination of the bore to the vertical, angularly measured; and the term bearing has reference to the angle between the magnetic north and the direction of dip.

In the preferred form shown in the drawings, I provide a cylindrical casing 1, having both its extremities 2 threaded internally. I also provide a head 3, formed of any suitable material, such as brass, steel or the like, having one end thereof sharpened, and having at the other end thereof a reduced portion 4, suitably threaded to engage the lower threaded portion of the casing 1. Adapted to engage the upper extremity of the cylindrical casing is a stopper 5 having the lower part 6 thereof reduced and suitably threaded so that it will removably engage the upper extremity of the casing. The upper portion 7 of the stopper is provided with a well 6ᵃ which will be described more fully hereinafter. The upper portion of the stopper is also reduced and suitably threaded to receive a correspondingly threaded portion 8 of a cap 9, the latter having its upper portion formed to constitute a hexagonal nut 10. Returning to the stopper 5, it should be mentioned that the latter is provided with a central bore 11 extending from the well 6ª to the interior of the cylindrical casing 1. The bore has the lower extremity threaded to engage the threaded portion of a tube 12, the latter extending to a point approximately the center of the chamber 13 of the casing 1. The lower end of the tube 12 is provided with a socket 14 adapted to receive an electric light globe 15.

The cap 9 has an opening 16 extending therethrough and adapted to receive a cable 17 formed of insulating material through which wires 18 extend. The lower extremity 19 of the cable is bifurcated and projects into the well 6 of the stopper 5 to a point below a ring 20, which is also arranged within the well. This ring is divided by means of an insulating strip 21. The wires 18 carried by the cable, pass through the ring, one wire on each side of the insulating strip, and pass through the central bore 11 and the tube 12 to the electric light globe. After the bifurcated ends of the cable have been positioned, as heretofore described, in the well, a retaining composition 22 of any suitable material, which will be both of an insulating character and impervious to water, is placed therein and tends to hold the cable in position. So that the cable may be more firmly secured, I have also provided a retaining member 23, having its upper end provided with a flange or extension 24, and its lower edge suitably beveled to engage the bifurcated ends of the cable, as shown in Fig. 1 of the drawings. The retaining member has also a central bore 25 which is adapted to register with the opening 16 in the cap 9 to allow the cable to pass into the well 6ª. When in position, the upper portion of the retaining member abuts against the lower face of the cap, so that when the latter is adjusted, the retaining member serves to hold the cable firmly in position, and to compact the material.

The casing 1 is adapted to have arranged therein a cylindrical member 26 formed of sensitized paper, or its equivalent, and a further cylinder of transparent material 27 located adjacent to its inner surface, so that it may act as a protection to the sensitized paper. The casing is partially filled with an opaque fluid 28, consisting of mercury, or the like, upon which floats a magnetic indicator 29 mounted on a ring 30 formed of any suitable material, such as pearl, or the like, which will prevent the mercury from coming in contact with the indicator. The indicator is provided at both ends with two wings 31, preferably triangular in form, and made from any suitable material, such as gutta percha, or the like. Intermediate the ends thereof, the indicator has a beveled opening 32, through which, when the indicator is in position within the casing, the sharpened point 33 of a fiber needle 34 passes. This needle 34 has its lower end 35 suitably threaded and is adapted to be received by a correspondingly threaded opening 36 in the head 3. Arranged within the casing and abutting against the upper inside face of the head is a ring 38 of any suitable material, such as felt or the like, which will prevent the mercury from amalgamating with the metal used in the construction of the head.

In the modified form illustrated in Fig. 3 of the drawings, there is provided a cylindrical casing A having its extremities B internally threaded, the upper extremity being adapted to removably receive a stopper C which has a reduced threaded portion D, which engages the upper extremity of the casing. The construction of the portion of the stopper not shown in Fig. 3, together with the means for lowering the instrument into the bore, is similar to that shown in Fig. 1 of the drawings, and which has already been referred to in describing the preferred form. The stopper has a central bore E through which wires F pass. I have provided a head G similar in form to that shown in Fig. 1, and having its upper extremity H reduced and threaded, so that it will removably engage the lower extremity B of the casing A. Located within the casing A and abutting against the lower face of the stopper C is an insulating member I having a portion J cut away to allow the wires F to pass therethrough. It might be mentioned that near the lower end of the bore E in the stopper, there is a holding member K formed of any suitable insulating material, through which the wires F pass. The chamber L, which is formed within the casing A, is adapted to have arranged therewithin a member M, such as sensitized paper or the like, and to have a further protecting member N of any suitable transparent material, which will abut against the inner face of the sensitized paper to protect the same. The casing is partially filled with a fluid O, such as mercury or the like, upon which is adapted to float a magnetic indicator P identical in form to that shown and described in Fig. 2 of the drawings. Returning to the head G, the latter has a conduit Q extending from the portion H to a point where it connects with a well R in the upper face of the head. Adapted to be arranged within said well and to project within the chamber L is a fiber member S. This member has an opening T near the base thereof, which registers with the conduit Q. As shown in Fig. 3, the wires F, after passing through the opening formed at the cut-away portion J of the member I, pass around the chamber L between the sensitized paper and the wall of the casing into the conduit Q. From this latter point they extend up through the fiber member S where they pass through a flexible cable U. The cable terminates at a sleeve V mounted on a float W, the sleeve carrying a socket X, upon which is arranged an electric light bulb Y. When the device is operatively assembled, the sleeve V passes through the beveled opening in the center of the indicator P, as shown in Fig. 3 of the drawings.

In the operation of my device, the latter is lowered down into a drill hole to any required depth at which it is desired to ascertain the dip and bearing of the bore. When the instrument has reached this point, time is given for the mercury within the casing to come to rest. The indicating mechanism, which includes the ring 30 and the indicator 29, will assume a position in the magnetic meridian. When this has resulted, the electric light bulb 15 is lighted by the one operating the instrument, the current being generated by means of a small dynamo, or the like. This causes an exposure of that part of the sensitized paper which is above the mercury, while simultaneously, through the agency of the wings 31 on the indicator, a portion of the paper at the north and south points is screened from the rays of light. On account of each set of wings being substantially parallel, certain rays of light will pass through the openings between the members of each pair, and on that account sharply record the position of the indicator on the paper. As these pairs of wings are oppositely disposed to one another, they admit light practically only in a vertical plane, and therefore, images of the openings between these wings on the developed paper will show the north and south regardless of any eccentricity at the center of the needle. After the exposure has been taken, the instrument is drawn from the bore and the stopper unscrewed from the casing. The exposed paper is then removed and developed.

The modified form illustrated in Fig. 3 is to be used in drill holes where the angle between the vertical and the center line of the bore is too great to be recorded by the instrument shown in the preferred form. This modified form is manipulated in a manner similar to that of the other form, but has this advantage, that the interior of the chamber is completely surrounded by sensitized paper, so that no matter at what angle the instrument may be positioned, an exposure will show the exact position of the indicating mechanism, even though the axis of the instrument might be in a substantially horizontal plane.

It might be added that a reversed photographic film can be used in lieu of the photographic paper and transparent film as described, without necessitating the use of any additional structure, should it be so desired.

In Fig. 4 I have shown a developed record produced upon the sensitized cylindrical member 26, the same being flattened out. Upon the record appears a dark portion 26$^a$ and a light portion 26$^b$. The line of demarcation between these portions is of the curved form resulting from the development of a cylinder intersected by a plane at an angle to the longitudinal axis of the cylinder. This line, $c$, indicates the outline of the surface of the mercury when the electric light was illuminated to produce the photographic record. The dark part of the record was produced by the action of the light upon the sensitized cylinder, the light part, being covered by mercury, was not affected by the illumination. The corresponding high and low points $a$ and $b$ of the line $c$ indicate diametrically opposite points of the cylinder, the line joining these points in the cylinder being the direction of the bearing of the instrument. Upon the darkened part of the record appear pairs of lighter spots, showing where the light was shaded by the interposition of the wings 31. The line joining these points when the photographic record was made is a meridian one. Consequently, the relation between the points $a$ and $b$ and the points $d$, will indicate the bearing of the instrument at the time the record was made. In the developed record, shown for example, herewith, the points $d$ coincide with the points $a$ and $b$, so that it appears that the bearing of the drill bore at the point where the record was made, was due north and south. The dip of the drill bore at the point where the record is made, is indicated by the height differences of the line $c$. This is obviously so because the dip controls the relative angularity of the plane forming the surface of the mercury and the longitudinal axis of the cylinder.

Having thus described my invention, I claim as new, and desire to secure by Letters Patent:

1. In a device of the class described, a body adapted to pass into a drill bore, a fluid therein, a member having a sensitized surface partly covered by said fluid, and means for producing a record upon a part of said surface above said fluid.

2. In a device of the class described a body adapted to pass into a drill bore, an opaque fluid within said body, a member encompassing the body of said fluid and partly covered thereby, said member having a sensitized surface, and means for making a photographic record upon said sensitized surface, above said fluid, whereby the line of contact between said fluid and said surface will appear in the photographic record.

3. In a device of the class described, a body adapted to pass into a bore, a floating member therein, tending to maintain a position of normal dip and bearing, and means for producing a record of the dip and bearing of said body relative to said member.

4. In a device of the class described, a body adapted to pass into a bore, a floating member therein, said member tending to maintain a normally horizontal position, and a position in the magnetic meridian, and means within said body and controllable from a point remote therefrom, for making a permanent record of the dip and the bearing of said body relative to said member.

5. A device of the class described, comprising a body adapted to pass into a bore, a sensitized member therein adapted to receive a photographic record, a floating member in said body and adapted to maintain a position of normal dip and bearing, and means for producing light within said body to make upon said sensitized member a photographic record of the position of said floating member relative to said body, at any desired point of the bore through which said body is passing.

6. A device of the class described, comprising a body adapted to pass into a bore, a sensitized member therein adapted to receive a photographic record, a fluid within said body, a member floating upon the surface of said fluid, and tending to maintain a position in the magnetic meridian, said member constituting an indicator, and means for producing an illumination within said body to record the position of said indicator photographically upon said sensitized member.

7. A device of the class described, comprising a hollow body having a fluid therein and adapted to pass into a bore, an indicator floating upon said fluid, a sensitized member within said body and adapted to have a photographic record produced thereon, an electric light within said body, and means for conducting current to said light.

8. In a device of the class described, a hollow body adapted to pass into a bore and containing a fluid, an indicator floating upon said fluid, said indicator tending to maintain a position in the magnetic meridian, a sensitized member within said body and extending around the inner wall thereof, means for holding said indicator central, an electric light within said body, and a cable for conducting current to said light, and for lowering and raising said body.

9. In a device of the class described, a hollow body adapted to pass into a bore, a sensitized member within said body and extending around the same, a transparent member within said body and extending around the same inside of said sensitized member, a fluid within said last-mentioned member, a floating indicator supported upon the surface of said fluid and tending to maintain a position in the magnetic meridian, an electric light within said body, a cable for conducting current to said light, said cable serving for raising and lowering said body, and means for securing said cable to said body.

10. In a device of the class described, a hollow body adapted to pass into a bore, a sensitized member within said body and extending entirely around the same, a transparent protective member within said sensitized member and extending entirely around the same, a fluid within said body and within said last-mentioned member; a floating indicator supported upon the surface of said fluid and tending to maintain a position alined with the magnetic meridian, an electric light within said body above said indicator and adapted when illuminated to produce a photographic record of the position of said indicator upon said sensitized member, a cable for conducting the current to said light, said cable serving for raising and lowering said body, means for securing said cable to said body, and a member within said body and serving to movably center said indicator.

11. In a device of the class described, a hollow body adapted to pass into a bore, a fluid partly filling said body, a sensitized sheet within said body, means for protecting said sensitized sheet from said fluid, an indicator floating upon said fluid and tending to maintain a position of normal dip and bearing, and means for producing a photographic record of the position of said indicator upon said sensitized sheet at any desired point of the bore.

12. In a device of the class described, a hollow body adapted to pass into a bore, a fluid partly filling said body, a sensitized member within said body, an indicator floating upon the surface of said fluid and of magnetic nature whereby it tends to maintain a position in the magnetic meridian, an electric light within said body, and means for illuminating said light to produce a photographic record upon said sensitized member of the position of said indicator relative to said body, said body having therein a needle for movably centering said indicator, said indicator at the ends being provided with wings for producing images of predetermined form upon said sensitized member.

13. In a device of the class described, a body comprising a hollow casing, a head at one end thereof and a stopper at the other end thereof, a sensitized sheet within said casing and extending around the same, a fluid within said casing and partly filling the same, a magnetic indicator floating upon said fluid, said body having a needle for movably centering said indicator, an electric light within said casing, and a cable secured to said stopper and serving to conduct current to said light and for raising and lowering said body.

14. In a device of the class described, a hollow body adapted to pass into a bore, and comprising a cylindrical casing, a head at one end thereof, and a stopper at the other end thereof, a sensitized member within said casing and encompassing the same, a fluid partly filling said casing, said head having a needle extending into said casing, an indicator floating upon said fluid and moving to center by said needle, said indicator having at the ends wings, an electric light within said casing, said stopper having a well, a cable extending into said well, means for securing said cable to said stopper, said stopper having therein conductors, and further conductors connecting said conductors of said cable to said well for carrying current to said light.

15. In a device of the class described, a body having a floating indicator therein, a sensitized member, a light for producing a photographic record of said indicator upon said sensitized member, said body having at the upper end a stopper provided with a well, a cable having the end located in said well, a plastic material within said well and serving for securing the end of said cable therein, a retaining member projected partly into said well, a cap movably associated with said stopper and serving to secure said retaining member in position, and conductors for connecting said cable to said light.

In testimony whereof I have signed my name to this specification in the presence of two subscribing witnesses.

ANTHONY FREDERICK BENSON.

Witnesses:
H. B. CHASE,
ANNABEL FLESCH.